(12) United States Patent
Narberhaus

(10) Patent No.: US 10,683,020 B2
(45) Date of Patent: Jun. 16, 2020

(54) DEVICE FOR TRANSMITTING DATA AND/OR SIGNALS

(71) Applicant: VOITH PATENT GMBH, Heidenheim (DE)

(72) Inventor: Markus Narberhaus, Hildesheim (DE)

(73) Assignee: VOITH PATENT GMBH, Heidenheim (DE)

( * ) Notice: Subject to any disclaimer, the term of this patent is extended or adjusted under 35 U.S.C. 154(b) by 359 days.

(21) Appl. No.: 15/559,669

(22) PCT Filed: Apr. 8, 2016

(86) PCT No.: PCT/EP2016/057726
§ 371 (c)(1),
(2) Date: Sep. 19, 2017

(87) PCT Pub. No.: WO2016/162469
PCT Pub. Date: Oct. 13, 2016

(65) Prior Publication Data
US 2018/0281826 A1    Oct. 4, 2018

(30) Foreign Application Priority Data

Apr. 10, 2015 (EP) .............................. 102015105514

(51) Int. Cl.
*B61G 5/10* (2006.01)
*B60D 1/64* (2006.01)
(Continued)

(52) U.S. Cl.
CPC .................. *B61G 5/10* (2013.01); *B60D 1/64* (2013.01); *B61L 15/0036* (2013.01); *G02B 6/3821* (2013.01)

(58) Field of Classification Search
CPC .......... B61G 5/10; B61L 15/0036; B60D 1/64; G02B 6/3821
See application file for complete search history.

(56) References Cited

U.S. PATENT DOCUMENTS 4,303,301 A * 12/1981 Teichert ................... B61G 5/10
385/73
6,179,479 B1 * 1/2001 Crivelli ................... B61G 5/10
385/73

(Continued)

FOREIGN PATENT DOCUMENTS

DE      1161581 A      1/1964
DE      29815511 U1    1/2000
(Continued)

*Primary Examiner* — Zachary L Kuhfuss
(74) *Attorney, Agent, or Firm* — Shumaker, Loop & Kendrick, LLP; Jason D. Miller

(57) ABSTRACT

A device for transmitting data and/or signals between a first car body of a multi-member vehicle mechanically connected a second car body. The device includes an interface element having at least one optical fiber transmission medium for a line-connected communication system of the vehicle. The interface element displaceable in the longitudinal coupling direction relative to a coupling head of the first car body from a first position, wherein the interface element with the optical fiber is fully accommodated in the coupling head of the first car body, into a second position and vice versa, wherein in the second position of the interface element, at least the frontal end region of the interface element projects from the coupling head of the first car body to establish a data connection between the optical fiber and a contact terminal of a coupling head of the second car body.

13 Claims, 8 Drawing Sheets

Figure 1A:
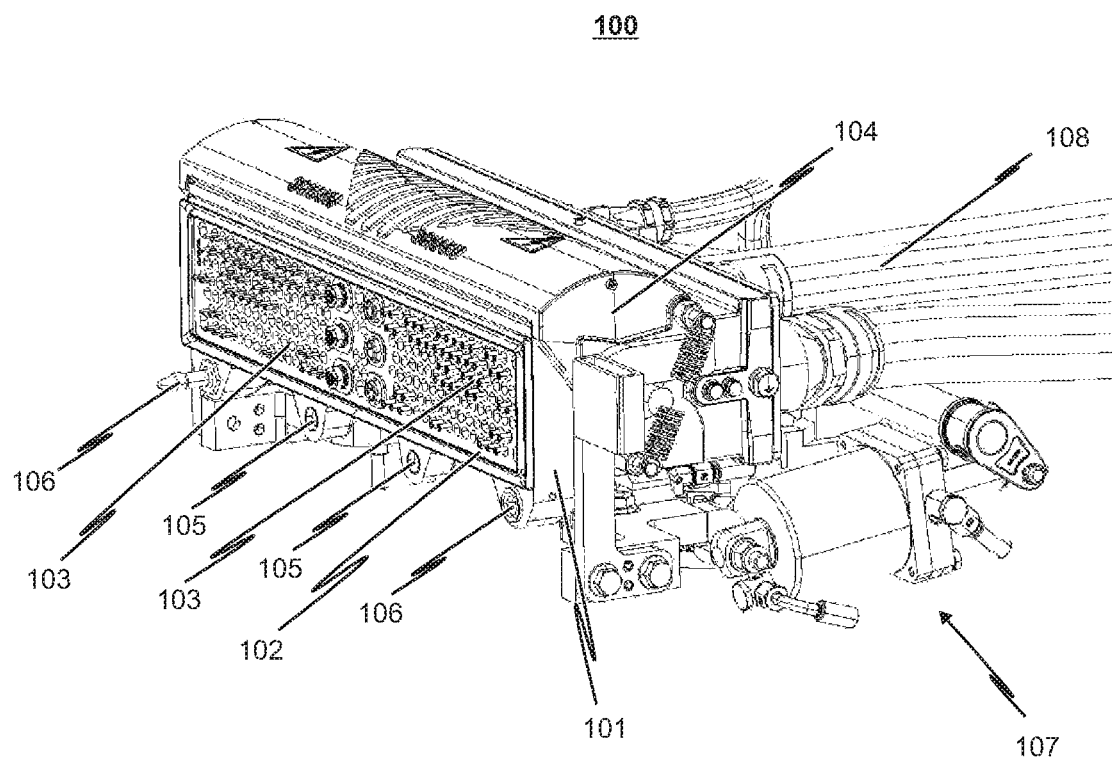

(51) Int. Cl.
*G02B 6/38* (2006.01)
*B61L 15/00* (2006.01)

(56) References Cited

U.S. PATENT DOCUMENTS

| | | | | |
|---|---|---|---|---|
| 6,883,973 B2* | 4/2005 | Meyer | B60D 1/64 | 385/35 |
| 7,011,454 B2* | 3/2006 | Caveney | G02B 6/3806 | 385/59 |
| 7,270,486 B2* | 9/2007 | Meyer | B61G 5/10 | 285/25 |
| 7,345,639 B2* | 3/2008 | Prill | B61L 15/0036 | 343/711 |
| 8,348,074 B2* | 1/2013 | Dahlstrom | B61G 5/10 | 213/1.3 |
| 8,985,356 B2* | 3/2015 | Krause | B61G 5/10 | 213/75 R |
| 9,048,948 B2* | 6/2015 | Paral | B61L 15/0036 | |
| 2018/0281826 A1* | 10/2018 | Narberhaus | B61G 5/10 | |

FOREIGN PATENT DOCUMENTS

| | | |
|---|---|---|
| DE | 19926058 A1 | 12/2000 |
| DE | 10015420 A1 | 10/2001 |
| DE | 10230379 A1 | 1/2004 |
| DE | 10310148 B4 | 3/2005 |
| DE | 102004037849 A1 | 7/2005 |
| DE | 102011080097 A1 | 1/2013 |
| DE | 102014110676 A1 | 2/2015 |
| DE | 102014110668 A1 | 2/2016 |
| EP | 1302381 A1 | 4/2003 |
| EP | 1454808 A1 | 9/2004 |
| EP | 0982215 B1 | 10/2004 |
| EP | 1826093 A1 | 8/2007 |
| EP | 2431201 A1 | 3/2012 |

* cited by examiner

DEVICE FOR TRANSMITTING DATA AND/OR SIGNALS

CROSS-REFERENCE TO RELATED APPLICATIONS

This patent application is a United States national phase patent application based on PCT/EP2016/057726 filed Apr. 8, 2016 which claims the benefit of German Patent Application No. 10 2015 105 514.7 filed Apr. 10, 2015. The entire disclosures of the above patent applications are hereby incorporated herein by reference.

FIELD

The invention relates to a device for transmitting data and/or signals between a first car body of a multi-member vehicle, a track-guided vehicle in particular, and a second car body mechanically connected to the first car body.

BACKGROUND

Electrical contact couplings are usually used in rail vehicle technology to transmit data and signals, in particular control signals, as well as transmit power between two adjacent car bodies of a multi-member vehicle. The arrangement, control and size of the electrical contact couplings employed depend on the available space within the vehicle and on the number of signals to be transmitted as well as the requirements of the rail car manufacturer and/or railway operator.

Electrical contact couplings are usually rendered in such a manner that two electrical contact couplings can be coupled and uncoupled automatically. The electrical contact couplings arranged on the vehicles or car bodies to be coupled together are thereby brought together in precise alignment by means of centering devices and thereafter pressed together at sealing surfaces arranged on the front ends of the electrical contact couplings so as to achieve a reliable sealing relative to the environment. A protective flap usually covers the front end of the electrical contact coupling in the uncoupled state in order to protect the coupling elements and any live contact elements of the electrical contact coupling there may be from being contacted and from contamination.

The electrical contact coupling is usually disposed on the upper side or laterally on the coupling head of a mechanical coupling and consists of a housing having a flap and a contact support with preset contacts (male/female contacts) for transmitting electrical signals.

Figure 1B:
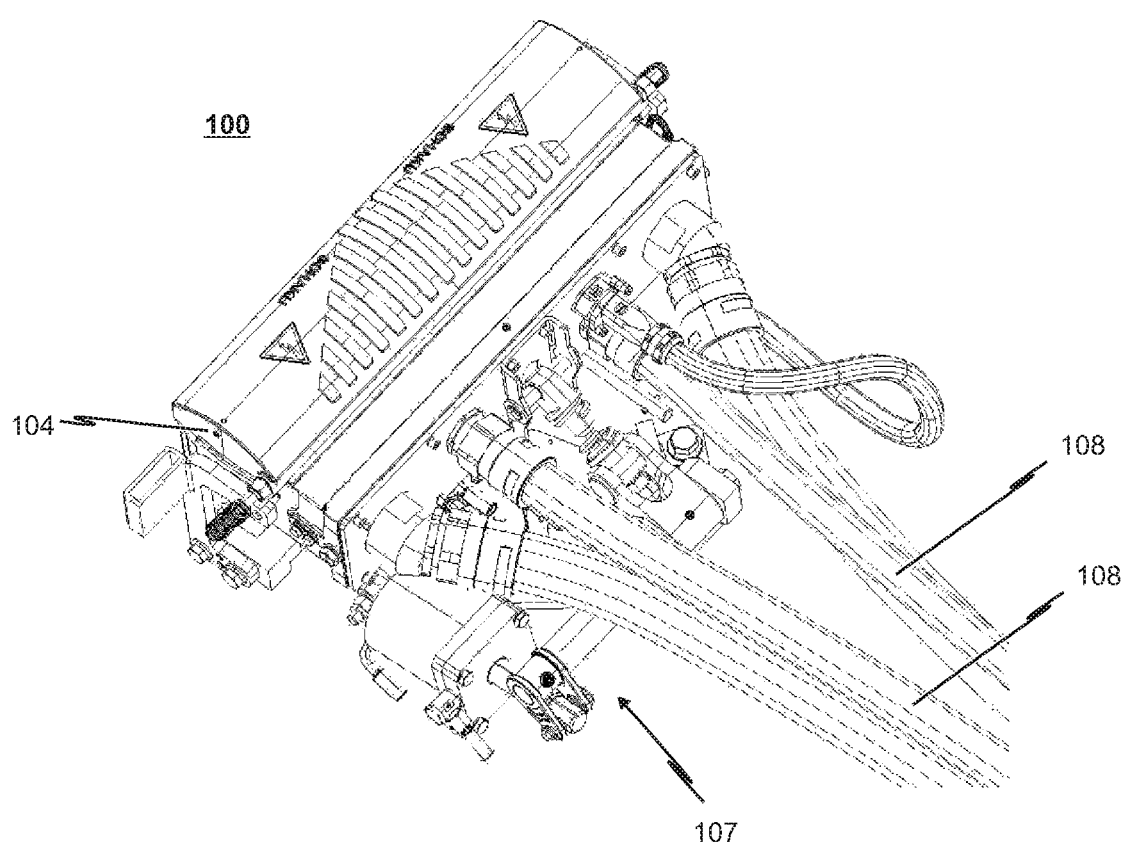
Figure 1C:
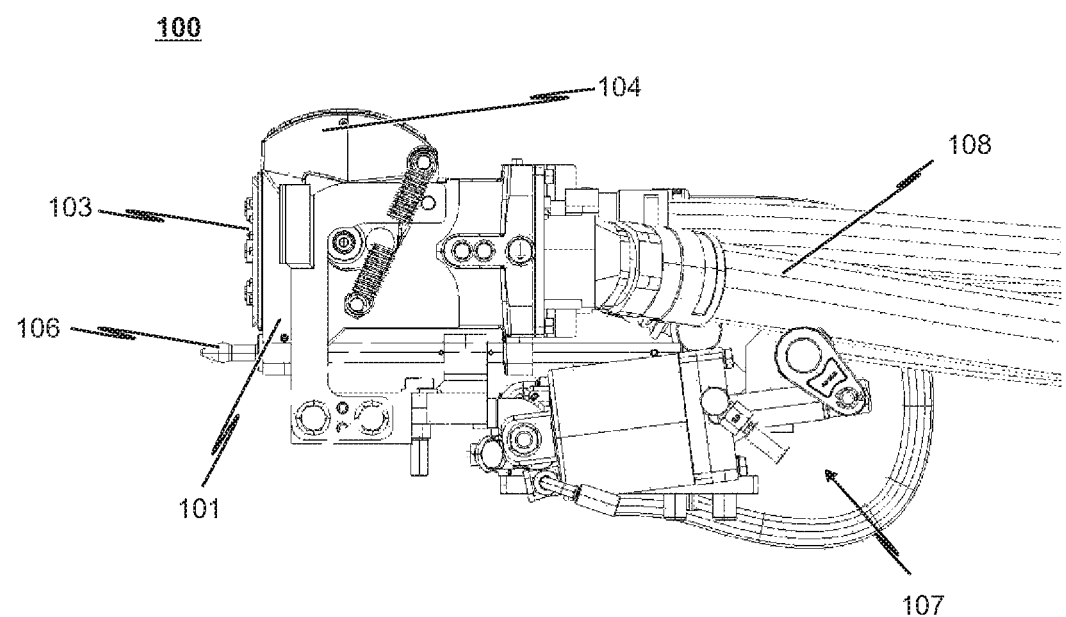

Reference is made in this regard to the representation provided in FIGS. 1A to 1C which depicts a known prior art electrical contact coupling 100 as an example, same shown its open state exposing the contact support 102 with male/female contacts 103.

The housing 101 of the electrical contact coupling 100 is rectangular in cross section, wherein guides 105 and frontal centering elements 106 are disposed at the outside facing the coupling head. The front face of the housing 101 of the electrical contact coupling 100 is tightly closed by the contact support 102. The contact support 102 is enclosed to the front by a profiled seal. Drill holes, in which connecting bolts are seated, are arranged in the contact support 102, whereby the male/female contacts 103 are screwed into the connecting bolts at the front side. The rear side of the housing 101 is tightly closed by a cover. The cable glands and the drive tab are located in the cover.

The flap 104 of the electrical contact coupling 100, which can protect the male/female contacts 103 on the contact support 102 as needed, is in pivotably-mounted arrangement in the front region of the housing 101 of the electrical contact coupling 100. The flap 104 protects the contacts 103 from contamination, water and mechanical damage in the uncoupled position and prevents people from accidentally making contact with them.

To couple the electrical contact couplings 100 of two adjacently disposed car bodies and/or vehicles, the electrical contact couplings 100 to be coupled are displaced forward into the common coupling plane relative to the mechanical coupling. The centering elements 106 of the facing housings 101 of the electrical contact couplings 100 slide into one another and align the housings 101 with each other. The respective contacts 103 of the electrical contact couplings 100 thereby meet one another precisely and the sealing frames are pressed against each other.

When being uncoupled, the contacts 103 of the electrical contact couplings 100 are separated again, and namely by the electrical contact couplings 100 being displaced rearward out of the coupling plane.

Each electrical contact coupling is typically provided with a corresponding mechanism so that the flap automatically opens/closes during coupling and uncoupling.

An electrical contact coupling for automatic central buffer couplings is for example known from printed publication EP 0 982 215 B1 which provides for a mechanical central buffer coupling on which the electrical contact coupling is held so as to be longitudinally displaceable. The electrical contact coupling known from this prior art comprises at least one connection line-connected plug-and-socket connection arranged at the point of coupling separation of each vehicle to be coupled. To avoid a redundant contact arrangement arranged symmetrically to the vertical central longitudinal plane of the coupling rod and to render the electrical contact coupling in a simpler and lighter design as a whole, the electrical contact coupling according to this prior art further comprises a longitudinally displaceable adapter box arranged between the respective plug-and-socket connections of the coupled rail vehicle in the coupling state and on only one of the respective plug-and-socket connections in the uncoupling state. The adapter box contains the necessary electrical connection lines for connecting the connecting lines of the vehicles/car bodies respectively to be coupled.

Furthermore, an electrical contact coupling for automatic central or central buffer couplings is known for example from printed publication DE 199 26 085 A1. This electrical contact coupling comprises a guided contact support with contacts for electrical connections mounted on the coupling head of the mechanical central or central buffer coupling and longitudinally displaceable in the longitudinal direction of the central or central buffer coupling. In order to achieve the most optimum protection possible relative the contacts for the electrical connection, this prior art provides for the contact support to be displaceable from a rearward, uncoupled position into a forward coupling-ready position, whereby the contact support is covered in the rearward position by a protective flap and exposed in the forward position with pivoted protective flap.

A fundamental problem with the electrical contact couplings known from the prior art and described above is in particular the mechanical wear on the current-carrying or data-carrying cables to be coupled by the electrical contact couplings of two adjacent car bodies. Because the electrical contact coupling in the conventional solutions first needs to be displaced relative to the mechanical coupling into the coupling-ready state, mechanical damage is unavoidable, particularly due to wear of the externally located current/data-carrying cables/cable harnesses which move relative to the coupling during the coupling process.

Moreover, a relatively complex mechanism is needed for the electrical coupling operation in the conventional solutions, same usually being mounted outside the electrical contact coupling housing. The further problem thus arises that the effects of weather such as ice and snow can lead to failure of the external components. In particular, a complete loss of the external mechanisms could result.

Regular maintenance and inspections of the current and data-carrying cables are furthermore necessary in the conventional systems in order to be able to ensure proper signal or data transmission. It is particularly necessary to regularly control and replace the connections of the electrical contact coupling parts which move relative to the mechanical coupling head since they are subjected to high mechanical wear.

A further possibility for achieving higher data transmission rates could in principle consist of providing a contactless transmission system between the car bodies of a multi-member vehicle for the transmitting of audio signals, video signals, operating data, commands and/or other bus data. To this end, the DE 10 2004 037 849 A1 printed publication for example proposes a transmission system consisting of a first HF component, a second HF component, a first transmit/receive device and a second transmit/receive device. The HF components are mounted on or in the train coupling.

However, the disadvantage to this known prior art solution is particularly to be seen in the only low-quality data transmission. In particular, a patch antenna, as printed publication DE 10 2004 37 849 A1 proposes, is only suitable to a limited extent for contactless data transmission in an automatic central buffer coupling since the signal transmission system's total attenuation is relatively high. This makes it imperative to select a correspondingly high transmission level for the respective patch antennas. Due to the disadvantageous emission pattern of patch antennas, however, a relatively high transmission level results in high interference emissions for the individual antenna elements. Thus, in practical use, such a signal transmission system may under some circumstances only provide unreliable and interference-prone data transmission.

SUMMARY

On the basis of this problem as set forth, the present invention is based on the task of specifying a device for transmitting data and/or signals between a first car body of a multi-member vehicle and a second car body mechanically connected to the first car body which is not only able to significantly reduce maintenance expenditures during operation but at the same time also enable realizing reliable and in particular non-interference-prone signal or data transmission at transmission rates of at least 10 megabit/second.

A further task of the invention lies in specifying an electrical contact coupling which is of overall simpler design and lighter than the solutions known from the prior art, whereby the electrical contact coupling can realize reliable and in particular non-interference-prone signal or data transmission at transmission rates of at least 10 megabit/second.

With regard to the device for transmitting data and/or signals, the task on which the present invention is based is solved by the subject matter disclosed herein.

With regard to the electrical contact coupling, the task on which the invention is based is solved by the subject matter disclosed herein.

Thus, in particular specified is a device for transmitting data and/or signals between a first car body of a multi-member vehicle, in particular a track-guided vehicle, and a second car body mechanically connected to the first car body, wherein the device comprises an interface element having at least one optical waveguide arrangement. The optical waveguide arrangement comprises at least one optical fiber as a transmission medium for a line-connected communication system of the multi-member vehicle. Additionally, the optical waveguide arrangement comprises a first terminal assigned to the first car body as well as a second terminal assigned to the second car body. The interface element is displaceable in the longitudinal coupling direction relative to a coupling head of the first car body from a first position, in which the interface element with the at least one optical waveguide arrangement is fully accommodated within the coupling head of the first car body, into a second position and vice versa, wherein at least the second terminal of the optical waveguide arrangement projects from the coupling head of the first car body in the second position so as to be able to establish a data connection between the at least one optical fiber of the optical waveguide arrangement and a contact terminal of a coupling head of the second car body.

The advantages which can be achieved with the inventive device for transmitting data and/or signals are obvious.

In contrast to the electrical contact couplings known from the prior art and described above, the present invention provides for the corresponding coupling housings of the respective electrical contact couplings to be able to be firmly (i.e. fixedly) connected to the corresponding mechanical coupling, particularly a central or central buffer coupling, and in particular no longer need to be displaceable relative to the mechanical couplings. This measure enables the coupling head to be configured significantly smaller than the coupling heads of the known prior art electrical contact couplings since a necessary mechanism to displace the coupling housing no longer needs to be additionally integrated into the coupling housing of the electrical contact coupling in the inventive solution.

Yet the inventive solution nevertheless ensures that the contacts of the electrical contact coupling will not be coupled until there is a rigid and substantially no-play coupling connection between the coupling heads of the mechanical couplings of two adjacent car bodies. Specifically, an interface element is provided to this end in the inventive device for transmitting data and/or signals which is displaceable relative to the coupling head of the first car body in the longitudinal coupling direction, and namely from a first position, in which the interface element is fully accommodated in the coupling head of the first car body, into a second position, in which the interface element is extended out of the coupling head of the first car body far enough to be able to establish a corresponding data connection with an adjacent second coupling head of an electrical contact coupling.

The interface element thus realized as being displaceable relative to the electrical contact coupling housing further enables the interconnecting of a line-connected communication system between two adjacent car bodies of a multi-member vehicle, in particular Ethernet or another local data network having data transmission rates of at least 10 megabit/second, since the interface element comprises at least one optical waveguide arrangement having at least one optical fiber as a transmission medium for the line-connected communication system of the multi-member vehicle.

It is hereby preferably provided for the at least one optical fiber of the optical waveguide arrangement to have an optical fiber core, particularly a thin glass core, signal-connecting the first and second terminal of the optical waveguide arrangement, whereby other embodiments for the optical fiber are of course also feasible.

In the second position of the interface element, i.e. in the position in which the interface element is displaced relative to the coupling head of the first car body (hereinafter also referred to as "first coupling head"), the first terminal of the optical waveguide arrangement assigned to the first car body is preferably arranged with respect to a contact terminal of the first coupling head such that a data connection can be established between the first terminal and the contact terminal of the first coupling head. In this second interface element position, the second terminal of the optical waveguide arrangement assigned to the second car body is preferably also arranged with respect to the contact terminal of the second car body's coupling head (hereinafter also referred to as "second coupling head") such that data connection can be established between the second terminal and the contact terminal of the second coupling head.

In order to be able to realize the most interference-free possible exchange of data with the inventive device, one preferential embodiment provides for the contact terminal of the first coupling head to be designed as a transmitting and/or receiving terminal and the first terminal of the optical waveguide arrangement to be designed as a receiving and/or transmitting terminal formed correspondingly complementary thereto, so that a corresponding data connection can be established between the contact terminal of the first car body and the optical waveguide arrangement of the interface element in the second position of the interface element. It is at the same time advantageous for the contact terminal of the second coupling head to be designed as a receiving and/or transmitting terminal and the second terminal of the optical waveguide arrangement to be designed as a transmitting and/or receiving terminal formed correspondingly complementary thereto so as to be able to establish a corresponding data connection between the optical waveguide arrangement and the contact terminal of the second coupling head in the second position of the interface element.

With respect to the contact terminal of the first coupling head and/or the second coupling head, one preferential implementation of the inventive solution provides for said contact terminal to be signal-connected to at least one optical fiber in order to conduct the data and/or signals to be transmitted via the interface element to the relevant contact terminal or, respectively, to correspondingly relay the data and/or signals transmitted via the interface element and received by the respective contact terminal.

Alternatively thereto, however, it is also conceivable for the contact terminal of the first and/or second coupling head to be signal-connected to at least one copper line in order to conduct the data and/or signals to be transmitted via the interface element to the relevant contact terminal or, respectively, to correspondingly relay the data and/or signals transmitted via the interface element and received by the respective contact terminal. In this embodiment, which makes use of at least one copper line to conduct the data transmitted via the interface element to the relevant contact terminal or, respectively, to relay the data and/or signals transmitted via the interface element and received by the respective contact terminal, it is advantageous for the respective contact terminal to be designed so as to convert the electrically transmitted signals into optical signals and vice versa.

Lastly, one advantageous further development of the inventive device for transmitting data and/or signals provides for the contact terminal of the first coupling head and the first terminal of the optical waveguide arrangement to lie one above the other vertically in the second position of the interface element. The same preferentially also applies to the contact terminal of the second coupling head and the second terminal of the optical waveguide arrangement. This is thereby a particularly simple to realize yet effective way of enabling data transmission with the interface element displaceable relative to the contact terminal when the interface element is in the second position. However, other embodiments are of course also feasible here.

According to a further aspect, the present invention relates to an electrical contact coupling for a track-guided vehicle, a railway vehicle in particular, wherein the electrical contact coupling comprises a coupling housing having at least one frontal housing opening as well as one first contact terminal support comprising at least one contact terminal arranged in the coupling housing. It is in particular provided with the electrical contact coupling according to the invention for same to be provided with a device for data and/or signal transmission of the type described above.

An advantageous further development of the inventive electrical contact coupling provides for the interface element to be configured as a preferably plate-shaped contacting support having at least one optical fiber extending in the contacting support's longitudinal direction.

The at least one optical fiber extending in the longitudinal direction of the contacting support and/or the first or respectively second terminal of the optical waveguide arrangement are thereby preferably arranged on a lower side of the contacting support so as to lower the risk of contamination during operation. However, providing the first and second terminal of the optical waveguide arrangement on an upper side of the contacting support is of course also conceivable.

It is in particular provided with the inventive electrical contact coupling for the first contact terminal support or the first contact terminal of the electrical contact coupling respectively to be configured as a receiving part in which at least part of the interface element is accommodated. The interface element is thereby displaceable relative to the first contact terminal support, or relative to the first contact terminal respectively, from its first position into its second position and vice versa.

In order to control the movement of the interface element relative to the contact terminal support or relative to the first contact terminal respectively, a corresponding guide is preferably provided.

According to a further aspect, the present invention further relates to an arrangement consisting of a first electrical contact coupling and an identically constructed second electrical contact coupling which serves as a mating coupling to the first electrical contact coupling, wherein the first electrical contact coupling is an electrical contact coupling of the type described above.

DRAWINGS

Figure 2A:
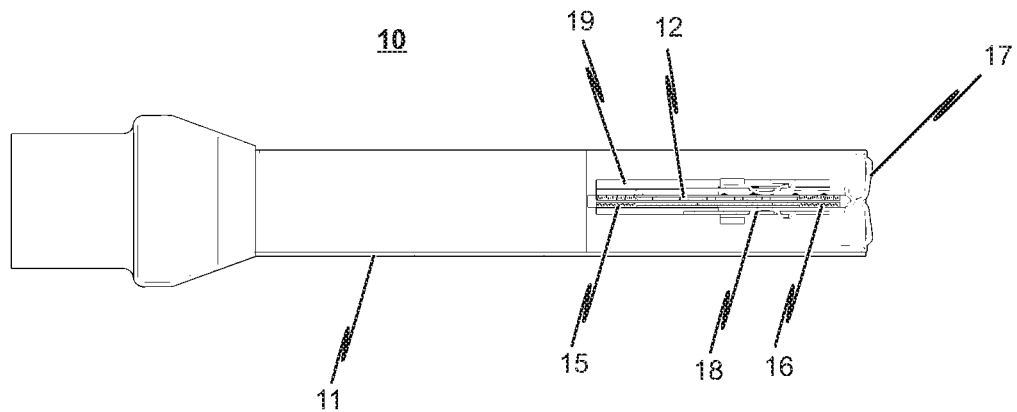
Figure 2B:
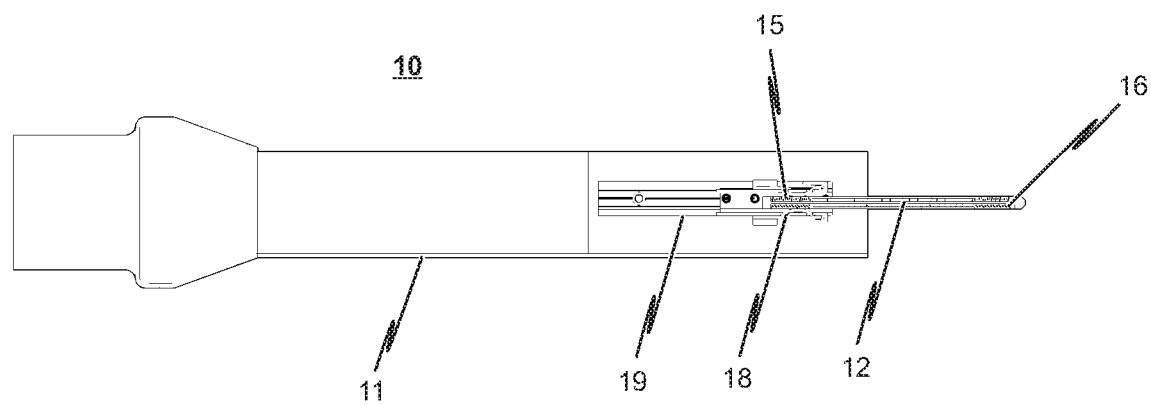
Figure 3:
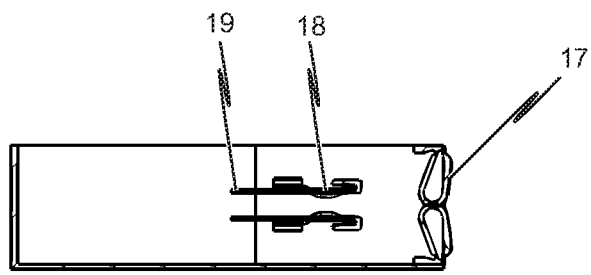
Figure 4A:
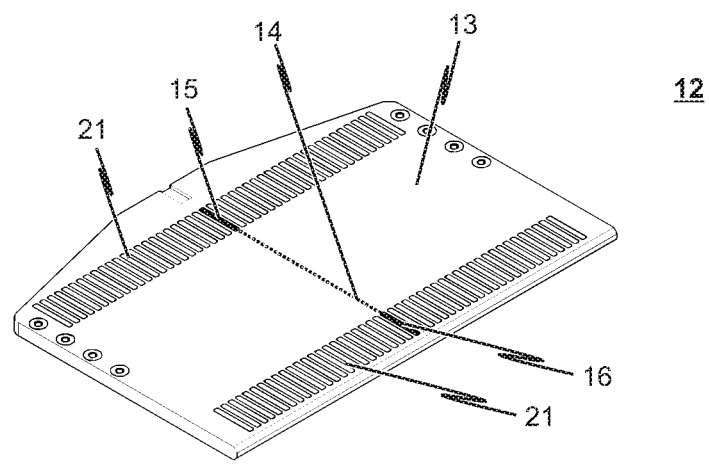
Figure 4B:
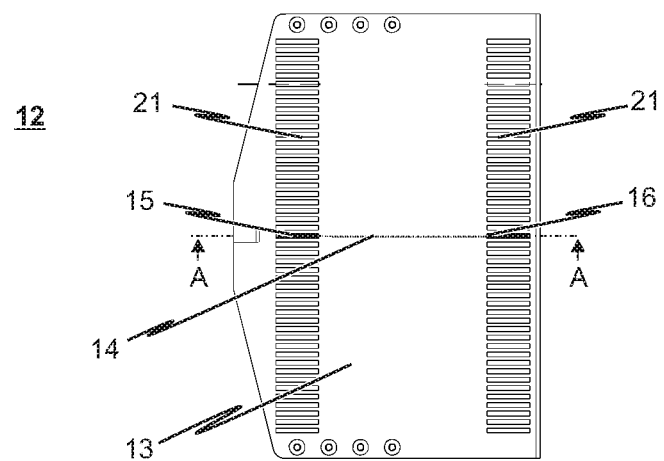
Figure 4C:
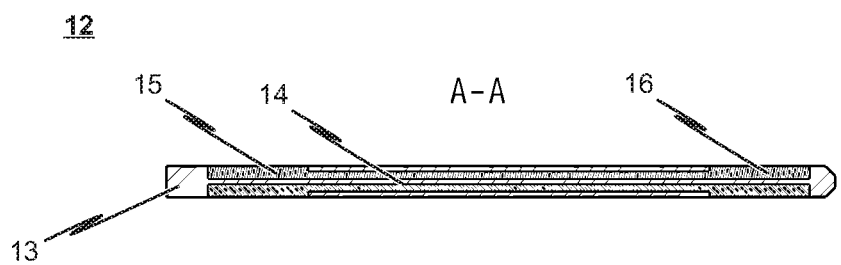
Figure 5A:
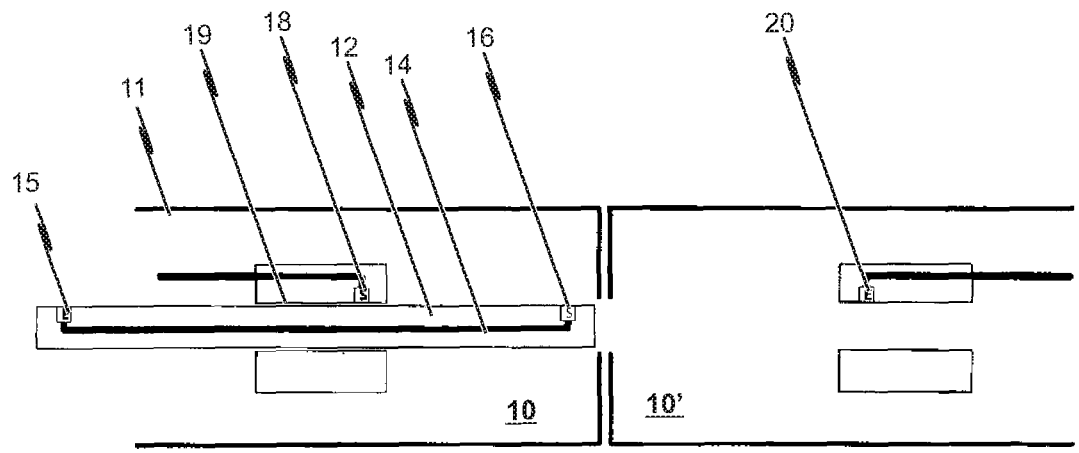
Figure 5B:
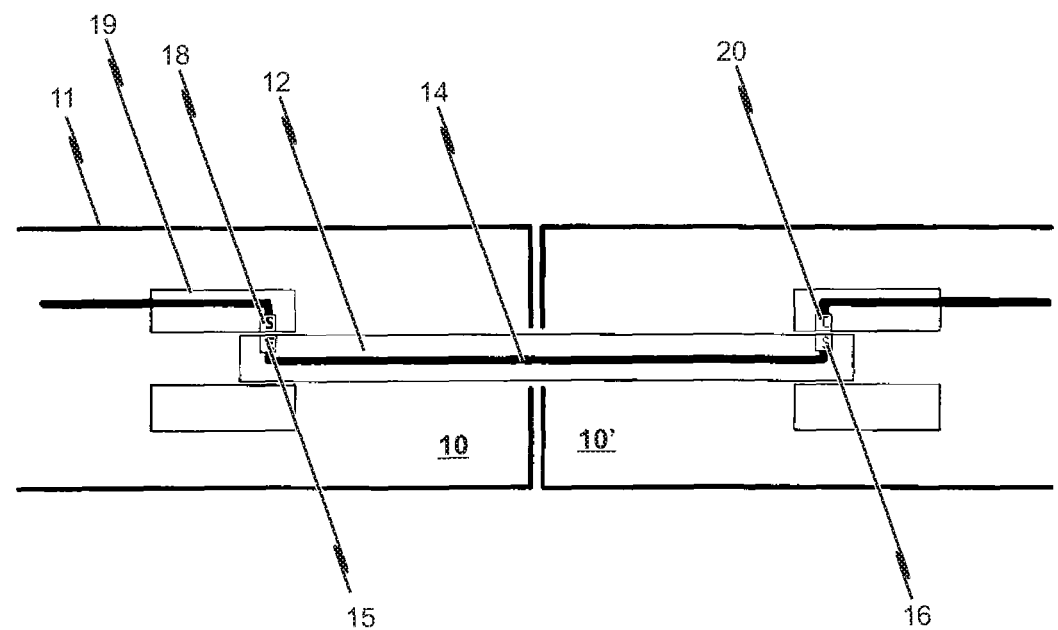
Figure 6:
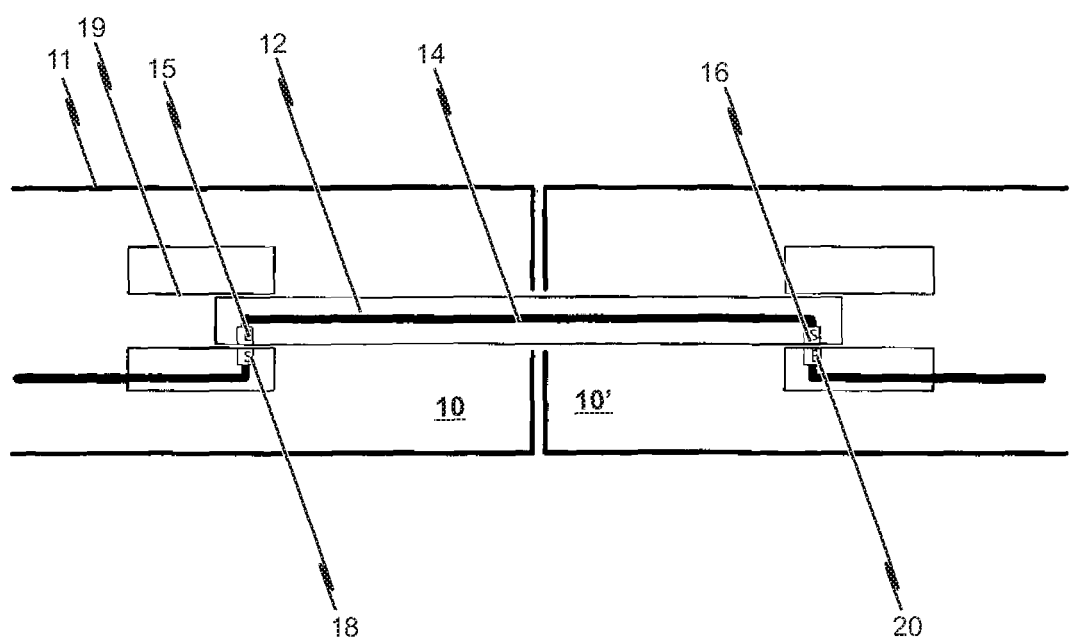

The following will reference the accompanying drawings in describing example embodiments of the inventive solution in greater detail:

Shown are:

FIG. 1A: an isometric view of a conventional, known prior art electrical contact coupling with open flap;

FIG. 1B: an isometric view from above of the conventional, known prior art electrical contact coupling according to FIG. 1A;

FIG. 1C: a side view of the conventional, known prior art electrical contact coupling according to FIG. 1A;

FIG. 2A: a sectional view through an example embodiment of the data/signal transmission device according to the invention in which the interface element of the data/signal transmission device is in its first position;

FIG. 2B: a sectional view through the example embodiment according to FIG. 2A in a state in which the interface element is in its second position;

FIG. 3: a schematic sectional view through a first contact terminal of an example embodiment of the inventive data/signal transmission device;

FIG. 4A: an isometric view of an example embodiment of an interface element designed as a plate-shaped contacting support;

FIG. 4B: a top view of the interface element according to FIG. 4A;

FIG. 4C: a sectional view along the A-A line in FIG. 4B;

FIG. 5A: a schematic sectional view through an arrangement consisting of a first electrical contact coupling and a second electrical contact coupling constructed identically thereto in which the interface element is in its first position;

FIG. 5B: the arrangement according to FIG. 5A in a state in which the interface element is in its second position; and FIG. 6: a further embodiment of the arrangement according to FIG. 5B.

DETAILED DESCRIPTION

FIG. 1A depicts a conventional electrical contact coupling 100 as commonly known in rail vehicle technology in an isometric view. The electrical contact coupling 100 is designed to be disposed on the upper side or laterally on a mechanical coupling head of a central or central buffer coupling and consists essentially of a coupling housing 101 having a flap 104 able to pivot in relation to same.

A contact support 102 arranged parallel to the coupling plane is further provided which closes off the front side of the coupling housing 101 and into which are inserted male/female contacts 103 by means of which the electrical contact coupling 100 can transmit electrical signals or energy to contact supports of a mating coupling of correspondingly complementary design not depicted in FIG. 1A.

As depicted in FIG. 1A, the coupling housing 101 is substantially rectangular in cross section, whereby guides 105 as well as frontal centering elements 106 are provided at the outside facing the coupling housing 101. The guides 105 serve in guiding a displacement of the coupling housing 101 relative to the coupling housing of a mechanical coupling, in particular a central or central buffer coupling (not shown). This is inasmuch necessary with the conventional, known prior art electrical contact coupling 100 to the extent that the electrical contact coupling 100 can only be coupled to a corresponding mating coupling after having first been displaced into the common (vertical) coupling plane. The conventional electrical contact coupling 100 thereby in particular needs to be provided with a corresponding displacement mechanism 107, which complicates the overall construction of the electrical contact coupling 100 and in particular results in the electrical contact coupling 100 being of relatively large dimension. An example displacement mechanism 107, which is in particular located at the outside of the known coupling housing 101, is depicted in FIGS. 1A to 1C.

A disadvantage of the conventional electrical contact coupling 100 depicted as an example in FIGS. 1A to 1C is moreover seen in the relative movement the coupling housing 101 must make during the coupling process relative to the mechanical coupling generally being coupled with stressing of the signal/data lines 108 connected to the electrical contact coupling 100, which inevitably results in mechanical wear of said signal/data lines 108.

Noted as a further disadvantage is that the conventional electrical contact coupling 100 depicted as an example in FIG. 1A is not designed to transmit signals and/or data at data transmission rates higher than 1 Gbit/s.

As will be described in greater detail below on the basis of the example embodiments of the inventive solution, these disadvantages no longer arise with the inventive solution.

In detail, the electrical contact coupling according to the invention is in particular characterized by the use of a special data/signal transmission device in which the electrical contact coupling or at least the coupling housing of the electrical contact coupling no longer needs to realize a relative moment to a mechanical coupling connected to the electrical contact coupling when the electrical contact coupling is to be conveyed into its coupling-ready state. Instead, the invention provides for the coupling housing of the electrical contact coupling to be fixedly connected/connectable to the respective mechanical coupling, whereby only an interface element, preferably being a plate-shaped contact support, can move relative to the mechanical coupling and the coupling housing of the electrical contact coupling and be converted from an uncoupled state (first position) into a coupled, respectively coupling-ready state (second position). When uncoupled, the interface element in its first position in which the interface element is fully accommodated in the coupling housing of the electrical contact coupling. In the coupled/coupling-ready state, the interface element is in a second position in which at least a frontal end region of the interface element projects from the coupling housing of the electrical contact coupling and thus lends itself to forming a signaling connection with a respective mating coupling.

FIG. 2A shows a schematic partial-section view of an example embodiment of the electrical contact coupling 10 according to the invention, wherein the inventive data/signal transmission device is integrated into this electrical contact coupling. In detail, the electrical contact coupling 10 is shown in a state in FIG. 2A in which the interface element 12 of the data/signal transmission device is in its first state; i.e. fully accommodated within the coupling housing 11 of the electrical contact coupling 10.

In FIG. 2B, the electrical contact coupling 10 according to FIG. 2A is shown in its coupling-ready state; i.e. in a state in which the interface element 12 is displaced toward the coupling plane relative to the coupling housing 11 of the electrical contact coupling 10 such that at least a frontal end region of the interface element 12 projects out of the coupling housing 11.

As can in particular also be seen from the FIGS. 4A to 4C depictions, the interface element 12 is designed in preferential embodiments of the inventive solution as a plate-shaped contacting support comprising a supporting substrate 13, in which at least one optical fiber 14 extending in the longitudinal direction of the interface element 12 is integrated.

The at least one optical fiber 14 integrated into the supporting substrate 13 of the interface element 12 is preferably an optical fiber core, particularly a thin glass core. The optical fiber core connects a first terminal 15 of the interface element 12 to a second terminal 16 of the interface element 12. The first terminal 15 of the interface element 12 is assigned to the electrical contact coupling 10 while the second terminal 16 of the interface element 12 is assigned to a mating coupling (not shown in FIGS. 2A, 2B) to be coupled to the electrical contact coupling 10.

In the first position of the interface element 12 shown in FIG. 2A, the interface element 12 is retracted into the coupling housing 11 of the electrical contact coupling 10 such that neither does the second terminal 16 of the interface element 12 project from the front end of the coupling housing 11 sealed by means of a seal arrangement.

In the second position of the interface element 12, however, the interface element 12 is displaced relative to the coupling housing 11 of the electrical contact coupling 10 toward the coupling plane far enough that the second terminal 16 of the interface element 12 projects from the front end of the coupling housing 11 so as enable realizing a data/signal connection with a mating coupling (not shown in FIG. 2B).

At the same time, the first terminal 15 of the interface element 12 assigned to the electrical contact coupling 10 is in signal/data contact with a contact terminal 18 of the electrical contact coupling 10 in the second position of the interface element 12 such that signals and/or data from contact terminal 18 can be conducted to the optical fiber 14 via the first terminal 15.

FIG. 3 shows a representation of an example embodiment of a contact terminal 18 of the electrical contact coupling 10 in a sectional view.

According thereto, the contact terminal 18 of the electrical contact coupling 10 is preferably implemented as a receiving element in which at least part of the interface element 12 (not shown in FIG. 3) is accommodated.

As can be seen from the FIGS. 2A and 2B depictions, the interface element 12 is thereby displaceable relative to the contact terminal 18 from its first position (cf. FIG. 2A) into its second position (cf. FIG. 2B) and vice versa.

To that end, the contact terminal 18 preferably comprises a respective guide 19 in order to ensure guided movement of the interface element 12 relative to the contact terminal 18.

The contact terminal 18 of the electrical contact coupling 10 is preferably designed as a transmitting terminal, wherein the first terminal 15 of the interface element 12 is designed as a receiving terminal formed correspondingly complementary thereto. A corresponding data connection can in this way be established in the second position of the interface element 12.

In the same way, the second terminal 16 of the interface element 12 is designed as a transmitting terminal, while the contact terminal 20 of a corresponding mating coupling 10' (see FIGS. 5A, 5B) is designed as a receiving terminal. Data and/or signal transmission can in this way be realized from the first contact terminal 18 to the second contact terminal 20 of the mating coupling 10' via the interface element 12.

Of course it is also conceivable in this context for the contact terminal 18 of the electrical contact coupling 10 to be designed as a receiving terminal and the first terminal 15 of the interface element 12 to be designed as a transmitting terminal formed correspondingly complementary thereto when data/signal transmission from the mating coupling 10' to the electrical contact coupling 10 is desired. The contact terminal 20 of the mating coupling 10' is then to be accordingly implemented as the transmitting terminal and the second terminal 16 of the interface element 12 as the receiving terminal.

Although not explicitly depicted in the drawings, the contact terminal 18 of the electrical contact coupling 10 is preferably signal-connected to at least one optical fiber in order to conduct respective data and/or signals to be transmitted via the interface element 12 to the contact terminal 18.

Alternatively thereto, however, it is also conceivable for the data and/or signals to be transmitted to contact terminal 18 to be conducted via interface element 12 by means of at least one copper line. The same also applies accordingly to the contact terminal 20 of the mating coupling 10'.

It is particularly conceivable in conjunction hereto for the electrical contact coupling 10, or the mating coupling 10' respectively, to be assigned a respective media converter which is fed the data and/or signals to be transmitted via the interface element 12 over a copper line, whereby the media converter is designed to convert the incoming data and/or signals into optical signals so that they can then be conducted via an optical fiber to contact terminal 18, from which the signals are then fed into the optical fiber 14 of interface element 12.

The following will specifically detail the example embodiment shown in FIGS. 5A and 5B.

In detail, FIG. 5A schematically depicts a first electrical contact coupling 10 and a corresponding mating coupling 10', with these being in a state in which the electrical contact coupling 10 is not (yet) in its coupling-ready or coupled state.

As indicated schematically in FIG. 5A, the interface element 12 is still fully retracted into, and thus accommodated in, the coupling housing 11 of the electrical contact coupling in this first position. To establish a signal/data connection between the electrical contact coupling 10 and the mating coupling 10', the interface element 12 is to be displaced relative to the coupling housing 11 of the electrical contact coupling 10 in the direction of the mating coupling 10', as suggested in FIG. 5B.

Specifically, the terminals (first terminal 15, second terminal 16) of the interface element 12 are arranged on the upper side of the interface element 12 in FIG. 5B such that in the coupled state as per FIG. 5B, the first terminal 15 realized as the receiving terminal and the second terminal 16 realized as the transmitting terminal of interface element 11 are vertically below the contact terminals 18, 20 of the electrical contact couplings 10, 10' realized as transmit/receive terminals.

Particularly preferentially, however, the first and second terminals 15, 16 of the interface element 12 are arranged on a lower side of the interface element 12, as depicted schematically in FIG. 6.

This embodiment even further reduces the risk of the terminals 15, 16 of the interface element 12 being contaminated during operation.

The signal/data transmission device according to the invention is particularly suited to data transmission rates of at least 10 megabit/second, as is particularly desired in multimedia connections.

As can be inferred from the representations provided in FIGS. 4A and 4B, it is of course conceivable that in addition to the at least one optical fiber 14, the interface element 12 is provided with further contact tabs 21, particularly also those which serve in (conventional) transmission of electrical signals.

The invention is not limited to the embodiments depicted in the drawings but rather yields from an integrated consideration of all the features disclosed herein in context.

LIST OF REFERENCE NUMERALS 10 electrical contact coupling
10' mating coupling
11 coupling housing of electrical contact coupling
12 interface element
13 supporting substrate
14 optical fiber
15 first terminal of interface element
16 second terminal of interface element
17 seal arrangement of electrical contact coupling
18 contact terminal of electrical contact coupling
19 guide
20 contact terminal of mating coupling
21 contact tab
100 electrical contact coupling (prior art)
101 coupling housing (prior art)
102 contact support (prior art)
103 male/female contact (prior art)
104 flap (prior art)
105 guide (prior art)
106 centering element (prior art)

The invention claimed is:

1. An electrical contact coupling for a track-guided vehicle, the electrical contact coupling comprising:
a coupling housing having at least one frontal housing opening;
a first contact terminal support comprising at least one contact terminal arranged in the coupling housing; and
a device for transmitting data and/or signals between a first car body of the track guided vehicle and a second car body of the track guided vehicle mechanically connected to the first car body, the device comprising:
an interface element having an optical waveguide arrangement, the optical waveguide arrangement further comprising:
an optical fiber as a transmission medium for a line-connected communication system of the track guided vehicle;
a first terminal assigned to the first car body; and
a second terminal assigned to the second car body, wherein the interface element is displaceable in a longitudinal coupling direction relative to a coupling head of the first car body from a first position, in which the interface element with the optical waveguide arrangement is fully accommodated in the coupling head of the first car body, into a second position and vice versa, wherein in the second position, at least the second terminal of the optical waveguide arrangement projects from the coupling head of the first car body to establish a data connection between the optical fiber of the optical waveguide arrangement and a contact terminal of a coupling head of the second car body, wherein the interface element is a plate-shaped contacting support having at least one optical fiber extending in a longitudinal direction of the contacting support.

2. The electrical contact coupling according to claim 1, wherein the optical fiber of the optical waveguide arrangement has an optical fiber core signal-connecting the first terminal and the second terminal.

3. The electrical contact coupling according to claim 2, wherein the optical fiber core is a thin glass core.

4. The electrical contact coupling according to claim 1, wherein in the second position of the interface element, the first terminal of the optical waveguide arrangement assigned to the first car body is arranged with respect to a contact terminal of the coupling head of the first car body such that a data connection can be established between the first terminal and the contact terminal of the coupling head of the first car body; and/or wherein in the second position of the interface element, the second terminal of the optical waveguide arrangement assigned to the second car body is arranged with respect to the contact terminal of the coupling head of the second car body such that a data connection can be established between the second terminal and the contact terminal of the coupling head of the second car body.

5. The electrical contact coupling according to claim 4, wherein the contact terminal of the coupling head of the first car body is a transmitting and/or receiving terminal and the first terminal of the optical waveguide arrangement is a receiving and/or transmitting terminal formed correspondingly complementary thereto for establishing a data connection in the second position of the interface element, and/or wherein the contact terminal of the coupling head of the second car body is a receiving and/or transmitting terminal and the second terminal of the optical waveguide arrangement is a transmitting and/or receiving terminal formed correspondingly complementary thereto for establishing a corresponding data connection in the second position of the interface element.

6. The electrical contact coupling according to claim 5, wherein the contact terminal of the coupling head of the first car body is signal-connected to an optical fiber to conduct the data and/or signals to be transmitted via the interface element to the contact terminal, and/or wherein the contact terminal of the coupling head of the second car body is signal-connected to an optical fiber to relay the data and/or signals transmitted via the interface element and received by the contact terminal.

7. The electrical contact coupling according to claim 4, wherein the contact terminal of the coupling head of the first car body is signal-connected to a copper line to conduct the data and/or signals to be transmitted via the interface element to the contact terminal of the coupling head of the first car body, and/or wherein the contact terminal of the coupling head of the second car body is signal-connected to a copper line to relay the data and/or signals transmitted via the interface element and received by the contact terminal of the coupling head of the second car body.

8. The electrical contact coupling according to claim 4, wherein in the second position of the interface element, the contact terminal of the coupling head of the first car body and the first terminal of the optical waveguide arrangement lie one above another vertically; and/or wherein in the second position of the interface element, the contact terminal of the coupling head of the second car body and the second terminal of the optical waveguide arrangement lie one above another vertically.

9. The electrical contact coupling according to claim 1, wherein the first and/or second terminal is/are arranged on a lower side of the contacting support.

10. The electrical contact coupling according to claim 1, wherein the first contact terminal support or the first contact terminal respectively is a receiving part in which at least part of the interface element is accommodated.

11. The electrical contact coupling according to claim 1, wherein the interface element is displaceable relative to the first contact terminal support, or relative to the first contact terminal respectively, from the first position into the second position and vice versa.

12. The electrical contact coupling according to claim 11, wherein a guide is further provided to control a movement of the interface element relative to the first contact terminal support or relative to the contact terminal respectively.

13. An arrangement comprising a first electrical contact coupling and an identically constructed second electrical contact coupling serving as a mating coupling to the first electrical contact coupling, wherein the first electrical contact coupling is an electrical contact coupling in accordance with claim 1.

* * * * *